United States Patent [19]

Saito et al.

[11] Patent Number: 5,972,538
[45] Date of Patent: Oct. 26, 1999

[54] CURRENT COLLECTOR FOR MOLTEN SALT BATTERY, PROCESS FOR PRODUCING MATERIAL FOR SAID CURRENT COLLECTOR, AND MOLTEN SALT BATTERY USING SAID CURRENT COLLECTOR

[75] Inventors: Kazuo Saito; Atsushi Hagiwara, both of Tokyo, Japan

[73] Assignee: Nisshinbo Industries, Inc., Tokyo, Japan

[21] Appl. No.: 08/856,316

[22] Filed: May 14, 1997

[30] Foreign Application Priority Data

May 17, 1996 [JP] Japan ...................................... 8-148451

[51] Int. Cl.$^6$ ...................................................... H01M 4/66
[52] U.S. Cl. ........................... 429/245; 429/233; 429/241; 429/102
[58] Field of Search ...................................... 429/233, 235, 429/241, 245, 101, 102, 104

[56] References Cited

U.S. PATENT DOCUMENTS

| | | | |
|---|---|---|---|
| 4,110,515 | 8/1978 | Gupta | 429/104 |
| 5,143,802 | 9/1992 | Wright | 429/103 |
| 5,723,232 | 3/1998 | Yamada et al. | 429/245 |
| 5,786,555 | 7/1998 | Saito et al. | 204/294 |

*Primary Examiner*—Maria Nuzzolillo
*Assistant Examiner*—Angela J. Martin
*Attorney, Agent, or Firm*—Kubovcik & Kubovcik

[57] ABSTRACT

A current collector for a molten salt battery using liquid sodium as an anode active material, which current collector has excellent electrolyte resistance and low electrical resistance and is able to be produced simply and rapidly at a low cost, and includes a current collector material in which a carbon composite material obtained by calcining a mixture of expanded powder with a thermosetting resin under a non-oxidizing atmosphere is bonded to a porous carbon material having a porosity of 99 to 30% and an average pore diameter of 0.5 mm to 5 $\mu$m. The above current collector is produced by a process including bonding a carbon composite material obtained by calcining a mixture of an expanded graphite powder with a thermosetting resin under a non-oxidizing atmosphere, to a porous carbon material having a porosity of 99 to 30% and an average pore diameter of 0.5 mm to 5 $\mu$m, or alternatively, bonding a carbon composite material precursor composed of a mixture of an expanded graphite powder with a thermosetting resin, to the above porous carbon material and then calcining the resulting assembly under a non-oxidizing atmosphere.

10 Claims, No Drawings

CURRENT COLLECTOR FOR MOLTEN SALT BATTERY, PROCESS FOR PRODUCING MATERIAL FOR SAID CURRENT COLLECTOR, AND MOLTEN SALT BATTERY USING SAID CURRENT COLLECTOR

BACKGROUND OF THE INVENTION

1. Field of the Invention

The present invention relates to a current collector for a molten salt battery, a process for producing a current collector material for the above current collector and a molten salt battery using the above current collector.

2. Description of Related Art

A molten salt battery in which liquid sodium is used as an anode active material, has such characteristics as (1) high energy density and (2) no self-discharge as compared with other secondary batteries, and has been expected-to have a usefulness as a battery for electric vehicle or a power storage battery.

The above molten salt battery comprises several parts. A current collector, which is used as one of the parts and plays a role of feeding an electron to an active material, has heretofore been produced by, for example, a method of bonding a porous carbon material to graphite, a method of bonding a porous carbon material to a vitreous carbon, or a method of bonding a porous carbon material to tungsten.

However, the current collector produced by the method of bonding a porous carbon material to graphite, has such problems that the graphite easily forms, during charging, an intercalation compound with a molten salt used as an electrolyte, this intercalation compound causes the expansion and shrinkage of the graphite, and finally, the current collector collapses. The current collector produced by the method of bonding a porous carbon material to a vitreous carbon forms no intercalation compound with the molten salt but has such a problem that since its electrical resistance is high, the battery resistance increases. The current collector produced by the method of bonding a porous carbon material to tungsten has such a problem that use of tungsten makes high the raw material cost and the processing cost. Therefore, these problems of the current collectors produced by the conventional methods result in a battery of high cost, low capacity and/or high internal resistance. Therefore, it has been desired to solve the above problems.

SUMMARY OF THE INVENTION

An object of the present invention is to provide a current collector for a molten salt battery, which is excellent in electrolyte resistance and low in electrical resistance and which can be simply and rapidly produced at a low cost.

Another object of the present invention is to provide a process for producing a current collector material for the above-mentioned current collector for a molten salt battery.

A still another object of the present invention is to provide a molten salt battery using the above-mentioned current collector for a molten salt battery.

The present inventors have made extensive research for solving the above-mentioned problems of prior art. That is, the present inventors thought of an idea that since expanded graphite has already openings between layers and does not collapse even in repeated charging and discharging, and moreover has high electroconductivity, the use thereof may result in an inexpensive current collector excellent in electrolyte resistance and high in electroconductivity. Based on the idea, the present inventors continued research. As a result, the present invention has been completed.

According to the present invention, there is provided a current collector for a molten salt battery using liquid sodium as an anode active material, which comprises a current collector material in which a carbon composite material obtained by calcining a mixture of an expanded graphite powder with a thermosetting resin under a non-oxidizing atmosphere is bonded to a porous carbon material having a porosity of 99 to 30% and an average pore diameter of 0.5 mm to 5 $\mu$m.

According to the present invention, there is further provided a process for producing a current collector material for a current collector for a molten salt battery, which process comprises bonding a carbon composite material obtained by calcining a mixture of an expanded graphite powder with a thermosetting resin under a non-oxidizing atmosphere, to a porous carbon material having a porosity of 99 to 30% and an average pore diameter of 0.5 mm to 5 $\mu$m, or alternatively, bonding a carbon composite material precursor composed of a mixture of an expanded graphite powder with a thermosetting resin, to a porous carbon material having a porosity of 99 to 30% and an average pore diameter of 0.5 mm to 5 $\mu$m and then calcining the resulting assembly under a non-oxidizing atmosphere.

According to the present invention, there is still further provided a molten salt battery which comprises liquid sodium as an anode active material and a current collector, wherein the current collector comprises a current collector material in which a carbon composite material obtained by calcining a mixture of an expanded graphite powder with a thermosetting resin under a non-oxidizing atmosphere is bonded to a porous carbon material having a porosity of 99 to 30% and an average pore diameter of 0.5 mm to 5 $\mu$m.

DETAILED DESCRIPTION OF THE INVENTION

The present invention is hereinafter described in detail.

The current collector of the present invention comprises a current collector material obtained by bonding a porous carbon material to a carbon composite material formed from expanded graphite powder and a thermosetting resin. The carbon composite material is explained first.

The expanded graphite used in the production of the above-mentioned carbon composite material in the present invention is a known material obtained by wet-oxidizing naturally occurring flake-like graphite using a liquid mixture of concentrated nitric acid and concentrated sulfuric acid in combination with a strong oxidizing agent such as potassium chlorate, potassium bichromate, a peroxide or the like, rapidly heating the resulting graphite at a high temperature of not less than 900° C. to decompose the oxidizing agent contained between layers of the graphite, thereby expanding the openings between the layers to 50 to 300 times. In the present invention, a powder of said expanded graphite is used.

The thermosetting resin used in the production of the carbon composite material in the present invention includes such known resins as polycarbodiimide resins, phenol resins, furan resins, epoxy resins and the like but is not limited thereto. The thermosetting resin may be in the form of a powder, a liquid or a solution in an appropriate solvent.

The quantitative proportion of the thermosetting resin to the expanded graphite may be varied depending upon the physical properties of the objective current collector, and may be 1 to 1,000 parts by weight, preferably 10 to 500 parts by weight, of the thermosetting resin per 100 parts by weight of the expanded graphite. When the proportion of the thermosetting resin is less than 1 part by weight, the carbon composite material cannot sufficiently keep its shape, so that such a proportion is not adequate. When the proportion of the thermosetting resin is more than 1,000 parts by weight, an increase in electroconductivity is not expected.

In producing the carbon composite material used in the present invention, first of all, a mixture is prepared by mixing expanded graphite and a thermosetting resin as the main components of the carbon composite material, and in this mixing step, there can be adopted such a usual, commercial method as a method using a stirring rod, a kneader, a ball mill, a mixer, a static mixer, a ribbon mixer or the like.

Subsequently, this mixture is, if necessary, molded into a desired size. This molding step can be carried out by a known method such as pressure molding, hydrostatic pressure molding, extrusion molding, injection molding, belt pressing, hot pressing, roll pressing or the like.

Subsequently, the mixture (or molded article) obtained is calcined to obtain a carbon composite material to be used in the present invention. This calcination step can be carried out by any known method and, for example, can be conducted under vacuum, or under a non-oxidizing atmosphere such as argon, nitrogen or the like. The calcining temperature in this calcination step has no upper limit, but is preferably within the range of 1,000° C. to 3,000° C. The calcination at a temperature higher than 3,000° C. is not realistic because the oxidative consumption of calcining furnace becomes remarkable. The calcination at a temperature lower than 1,000° C. gives a carbon composite material of high electrical resistance.

The porous carbon material used along with the carbon composite material in the production of a current collector in the present invention may be in the form of, for example, a felt, a non-woven fabric, a woven fabric, a carbon particle-bonded porous material or foam, or a combination of these forms, and has a porosity of 99 to 30%, preferably 95 to 50% and an average pore diameter of 0.5 mm to 5 $\mu$m, preferably 0.2 mm to 20 $\mu$m.

When the above porous carbon material has a porosity of more than 99%, the strength thereof is insufficient and it cannot be applied to practical use, while when it has a porosity of less than 30%, the active material does not sufficiently enter the interior of the current collector, and the resulting battery has a high internal resistance. When the average pore diameter is more than 0.5 mm, the current collecting efficiency becomes inferior, giving a battery of high internal resistance. On the other hand, when the average pore diameter is less than 5 $\mu$m, the deposition of sodium chloride caused by discharging invites a reduction in effective reaction area and the current collecting efficiency becomes inferior, giving a battery of high internal resistance.

In the present invention, the carbon composite material and the above porous carbon material are bonded to each other with, for example, an adhesive, whereby a current collector material used in the present invention can be prepared. The adhesive used may be any adhesive as far as it is excellent in heat resistance and electrolyte resistance, and as the adhesive, there can be mentioned, for example, a carbonaceous adhesive comprising non-crystalline carbon or expanded graphite powder as the main component.

The present process for producing the above-mentioned current collector material is not limited to the above-mentioned one and may comprise bonding a porous carbon material to a carbon composite material precursor which is a-mixture of expanded graphite with a thermosetting resin (or, if necessary, a molded article obtained by molding the precursor to a desired size) and then calcining the resulting assembly under a non-oxidizing atmosphere. The adhesive to be used for bonding this precursor (or its molded article) to the porous carbon material and the calcination conditions and the like may be the same as mentioned as to the bonding of the carbon composite material to the porous carbon material.

The current collector material obtained as mentioned above is formed into such a fillable shape that the current collector material can be filled in between the cathode used in the present invention and $\beta$"-alumina which is a solid electrolyte, whereby the present current collector is obtained. The "fillable shape" need not always be previously formed and may have a desired shape after filling, that is, the current collector material may previously be processed or molded into the fillable shape or may have a desired shape after being forced into and filled in between the cathode and $\beta$"-alumina which is a solid electrolyte.

For fabricating a battery using the above current collector, any known method may be used. For example, $\beta$"-alumina (solid electrolyte) is placed between a cathode and an anode; the cathode is filled with the above current collector; an electroconductive molten salt is used as the cathode and liquid sodium is used as the anode. As the electroconductive molten salt, there can be mentioned a molten salt obtained by dissolving a chloride of a calcogen such as sulfur, selenium, tellurium or the like or a chloride of a transition metal such as iron, nickel, cobalt, chromium, manganese or the like, in an AlCl$_3$/NaCl mixture, a KCl/AlCl$_3$ mixture or the like.

DESCRIPTION OF THE PREFERRED EMBODIMENTS

Examples are shown below to explain the present invention in more detail.

EXAMPLES 1 to 7

An expanded graphite powder and a polycarbodiimide resin were mixed in the amounts shown in Table 1, and the mixture was pressure-molded at 100 kg/cm$^2$ to prepare a molded article. This molded article was calcined at a temperature of 1,000° C., 2,000° C. or 3,000° C. under an argon atmosphere to obtain a carbon composite material. This carbon composite material was bonded to one of the porous carbon materials shown in Table 1 with an electroconductive adhesive to prepare current collector materials.

Subsequently, the electrical resistance of each of the current collector materials was measured by a 4-probe method in which a copper plate of a 40 mm×40 mm square and a 0.1-mm thickness was applied to the current collector of the same size and the copper plate was fitted with lead wires.

A battery was fabricated using a current collector obtained from the above current collector material as a positive electrode current collector and tungsten as a negative electrode current collector and using liquid sodium as an anode and, as a cathode, sulfur tetrachloride dissolved in a mixture of sodium chloride with aluminum chloride. This battery was subjected to charging and discharging with a constant current of 500 mA, after which the appearance of the current collector after 2,000 cycles of charging and discharging was observed. The battery resistance was measured at the first cycle and at the 2,000th cycle by an alternating current impedance method (frequency for measurement: 1 kHz).

The results are shown in Table 1.

TABLE 1

| Example No. | 1 | 2 | 3 | 4 | 5 | 6 | 7 |
|---|---|---|---|---|---|---|---|
| Expanded graphite (parts by wt.) | 100 | 100 | 100 | 100 | 100 | 100 | 100 |
| Polycarbodiimide resin (parts by wt.) | 10 | 100 | 500 | 100 | 100 | 100 | 100 |
| Calcining temp. (° C.) | 1000 | 1000 | 1000 | 2000 | 3000 | 1000 | 1000 |
| Porous carbon material | Porous-1 | " | " | " | " | Porous-2 | Porous-3 |
| Electrical resistance (mΩ) | 200 | 200 | 270 | 120 | 170 | 230 | 280 |
| Appearance after 2000 cycles of charging & discharging | Pass | Pass | Pass | Pass | Pass | Pass | Pass |
| Inner electrical resistance at 1st cycle (Ω · cm²) | 5.2 | 5.4 | 6.0 | 4.7 | 4.8 | 5.4 | 6.2 |
| Inner electrical resistance at 2000th cycle (Ω · cm²) | 5.4 | 5.7 | 5.7 | 4.9 | 5.1 | 5.6 | 6.5 |

In Table 1, "Porous-1" means a carbon foam having a porosity of 95% and an average pore diameter of 0.2 mm; "Porous-2" means a carbon foam of a porosity of 80% and an average pore diameter of 0.1 mm; and "Porous-3" means a carbon felt having a porosity of 50% and an average pore diameter of 20 µm (the same applies to the following Examples and Comparative Examples).

EXAMPLES 8 to 12

An expanded graphite powder and a phenol resin were mixed in the amounts shown in Table 2 and the mixture was pressure-molded at 100 kg/cm² to prepare a molded article. This molded article was calcined at a temperature of 1,000° C., 2,000° C. or 3,000° C. under an argon atmosphere to obtain a carbon composite material. This carbon composite material was bonded to one of the porous carbon materials shown in Table 2 with an electroconductive adhesive to prepare current collector materials. In the same manner as in Example 1, the electrical resistance of each of the current collector materials was measured, and thereafter, a battery was fabricated and then subjected to 2,000 cycles of charging and discharging, after which the appearance of the current collector was observed. Also, the battery resistance was measured at the first cycle and at the 2,000th cycle. The results obtained are shown in Table 2.

EXAMPLE 13

100 parts by weight of an expanded graphite powder was mixed with 100 parts by weight of a polycarbodiimide resin and the mixture was pressure-molded at 100 kg/cm² to prepare a molded article. This molded article was bonded to a carbon foam with an electroconductive adhesive and the resulting assembly was then calcined at a temperature of 1,000° C. under an argon atmosphere, to prepare a current collector material. In the same manner as in Example 1, the electrical resistance of the current collector material was measured and thereafter a battery was fabricated using the current collector material and then subjected to 2,000 cycles of charging and discharging, after which the appearance of the current collector was observed. Moreover, the battery resistance was measured at the first cycle and the 2,000th cycle. The results obtained are shown in Table 2.

TABLE 2

| Example No. | 8 | 9 | 10 | 11 | 12 | 13 |
|---|---|---|---|---|---|---|
| Expanded graphite (parts by wt.) | 100 | 100 | 100 | 100 | 100 | 100 |
| Polycarbodiimide resin (parts by wt.) | | | | | | 100 |
| Phenol resin (parts by wt.) | 100 | 500 | 500 | 100 | 100 | |
| Calcining temp. (° C.) | 1000 | 1000 | 1000 | 2000 | 3000 | 1000 |
| Porous carbon material | Porous-1 | " | " | " | " | " |
| Electrical resistance (mΩ) | 235 | 260 | 320 | 160 | 200 | 205 |
| Appearance after 2000 cycles of charging & discharging | Pass | Pass | Pass | Pass | Pass | Pass |
| Inner electrical resistance at 1st cycle (Ω · cm²) | 5.8 | 5.9 | 6.7 | 4.7 | 5.2 | 5.3 |
| Inner electrical resistance at 2000th cycle (Ω · cm²) | 6.2 | 7.2 | 8.0 | 6.0 | 6.6 | 6.5 |

COMPARATIVE EXAMPLES 1 AND 2

An expanded graphite powder and a polycarbodiimide resin were mixed in the amounts shown in Table 3 and the mixture was pressure-molded at 100 kg/cm² to prepare a molded article. This molded article was calcined at a temperature of 1,000° C. under an argon atmosphere, to prepare a carbon composite material. To this composite material was bonded one of the porous carbon materials shown in Table 3 with an electroconductive adhesive to prepare current collector materials. In the same manner as in Example 1, the electrical resistance of each of the current collector materials was measured and thereafter a battery was fabricated and then subjected to 2,000 cycles of charging and discharging, after which the appearance of the current collector was observed. Moreover, the battery resistance was measured at the first cycle and the 2,000th cycle. The results obtained are shown in Table 3.

TABLE 3

| Comparative Example No. | 1 | 2 |
|---|---|---|
| Expanded graphite (parts by wt.) | 100 | 100 |
| Polycarbodiimide resin (parts by wt.) | 0.1 | 2,000 |
| Calcining temperature (° C.) | 1000 | 1000 |
| Porous carbon material | Porous-1 | Porous-1 |
| Electrical resistance (mΩ) | 260 | 4,500 |
| Appearance after 2000th cycle of charging & discharging | Note 1 | Pass |
| Inner electrical resistance at 1st cycle (Ω· cm²) | — | 54.0 |
| Inner electrical resistance at 2000th cycle (Ω · cm²) | — | 54.2 |

Note 1: Right after immersion in electrolyte, the electrode collapsed.

COMPARATIVE EXAMPLE 3

A carbon foam (manufactured by Nisshinbo Industries, Inc.) was bonded to graphite (density: 2.0 g/cm³) with an electroconductive adhesive to prepare a current collector material. In the same manner as in Example 1, the electrical resistance of the current collector material was measured and thereafter a battery was fabricated and subjected to 2,000 cycles of charging and discharging, after which the appearance of the current collector was observed. Moreover, the battery resistance was measured at the 1st cycle and at the 2,000th cycle. The results obtained are shown in Table 4.

COMPARATIVE EXAMPLE 4

A carbon foam (manufactured by Nisshinbo Industries, Inc.) was bonded to vitreous carbon (manufactured by Nisshinbo Industries, Inc.) with an electroconductive adhesive-to prepare a current collector material. In the same manner as in Example 1, the electrical resistance of the current collector material was measured and thereafter a battery was fabricated and subjected to 2,000 cycles of charging and discharging, after which the appearance of the current collector was observed. Moreover, the battery resistance was measured at the 1st cycle and at the 2,000th cycle. The results obtained are shown in Table 4.

TABLE 4

| Comparative Example No. | 3 | 4 |
| --- | --- | --- |
| Porous carbon material | Porous-1 | Porous-2 |
| Electrical resistance (mΩ) | 115 | 5,000 |
| Appearance after 2000 cycles of charging & discharging | Note 2 | Pass |
| Inner electrical resistance at 1st cycle (Ω · cm$^2$) | 4.6 | 60.1 |
| Inner electrical resistance at 2000th cycle (Ω · cm$^2$) | — | 60.3 |

Note 2: Graphite collapsed at the 23rd cycle and the charging and discharging became impossible.

COMPARATIVE EXAMPLES 5 to 10

To the same carbon composite material as obtained in Example 3 was bonded one of the porous carbon materials having the porosities and average pore diameters shown in Table 5 with an electroconductive adhesive to prepare current collector materials. In the same manner as in Example 1, the electrical resistance of each of the current collector materials was measured and a battery was fabricated and then subjected to 2,000 cycles of charging and discharging, after which the appearance of the current collector was observed. Moreover, the battery resistance was measured at the first cycle and at the 2,000th cycle. The results obtained are shown in Table 5.

TABLE 5

| Comparative Example No. | 5 | 6 | 7 | 8 | 9 | 10 |
| --- | --- | --- | --- | --- | --- | --- |
| Porosity of porous carbon material (%) | 99 | 95 | 50 | 50 | 99 | 20 |
| Average pore diameter of porous carbon material (mm) | 1 | 0.005 | 1 | 0.005 | 0.2 | 0.2 |
| Electrical resistance (mΩ) | Note 3 | " | 270 | 220 | Note 3 | 250 |
| Appearance after 2000 cycles of charging & discharging | Note 3 | " | Pass | Pass | Note 3 | Pass |
| Inner electrical resistance at 1st cycle (Ω · cm$^2$) | Note 3 | " | 1200 | 745 | Note 3 | 1050 |
| Inner electrical resistance at 2000th cycle (Ω · cm$^2$) | Note 3 | " | Note 4 | " | Note 3 | Note 4 |

Note 3: Strength was low and measurement was impossible.
Note 4: Inner electrical resistance was high and measurement was impossible.

As stated above, the present current collector for a molten salt battery is excellent in electrolyte resistance and low in electrical resistance, and the present process for producing a current collector material for the above current collector for a molten salt battery can simply and rapidly produce the current collector material at a low cost.

What is claimed is:

1. A current collector for a molten salt battery which uses liquid sodium as an anode active material, the current collector comprising a current collector material in which a carbon composite material obtained by calcining a mixture of an expanded graphite powder with a thermosetting resin under a non-oxidizing atmosphere, the amount of the thermosetting resin in the mixture being 1 to 1,000 parts by weight per 100 parts by weight of the expanded graphite, is bonded to a porous carbon material having a porosity of 99 to 30% and an average pore diameter of 0.5 mm to 5 μm.

2. The current collector for a molten salt battery according to claim 1, wherein the thermosetting resin is a polycarbodiimide resin, a phenol resin, a furan resin or an epoxy resin.

3. The current collector for a molten salt battery according to claim 1, wherein the carbon composite material is obtained by calcining the mixture at a temperature of 1,000 to 3,000° C.

4. The current collector for a molten salt battery according to claim 1, wherein the porous carbon material is in the form of a felt, a non-woven fabric, a woven fabric, a carbon particle-bonded porous article or foam, or a combination of these forms.

5. A process for producing a current collector material for a current collector for a molten salt battery, which process comprises bonding a carbon composite material obtained by calcining a mixture of an expanded graphite powder with a thermosetting resin under a non-oxidizing atmosphere to a porous carbon material having a porosity of 99 to 30% and an average pore diameter of 0.5 mm to 5 μm.

6. The process for producing a current collector material according to claim 5, wherein the carbon composite material is obtained by calcining the mixture at a temperature of 1,000 to 3,000° C.

7. A process for producing a current collector material for a current collector for a molten salt battery, which process comprises bonding a carbon composite material precursor composed of a mixture of an expanded graphite powder with a thermosetting resin, to a porous carbon material having a porosity of 99 to 30% and an average pore diameter of 0.5 mm to 5 μm and then calcining the resulting assembly under a non-oxidizing atmosphere.

8. The process for producing a current collector material for a current collector for a molten salt battery according to claim 7, wherein the calcination under a non-oxidizing atmosphere is effected at a temperature of 1,000 to 3,000° C.

9. A molten salt battery comprising liquid sodium as an anode active material and a current collector, wherein the current collector comprises a current collector material in which a carbon composite material obtained by calcining a mixture of an expanded graphite powder with a thermosetting resin under a non-oxidizing atmosphere is bonded to a porous carbon material having a porosity of 99 to 30% and an average pore diameter of 0.5 mm to 5 μm.

10. The current collector for a molten salt battery according to claim 2, wherein the thermosetting resin is a polycarbodiimide resin, a phenol resin, a furan resin or an epoxy resin.

* * * * *